United States Patent Office 2,786,867
Patented Mar. 26, 1957

2,786,867

SYNTHESIS OF NITRILES FROM ALDEHYDES AND AMMONIA

Hugh J. Hagemeyer, Jr., Benjamin Thompson, and Charles W. Hargis, Kingsport, Tenn., assignors to Eastman Kodak Company, Rochester, N. Y., a corporation of New Jersey No Drawing. Application August 5, 1953,
Serial No. 372,600

12 Claims. (Cl. 260—465.1)

This invention relates to the manufacture of nitriles and is more particularly concerned with an improved process of manufacturing nitriles from the corresponding aldehydes by reaction with ammonia.

The general reaction of aldehydes with ammonia to produce nitriles is well known in the art. It has been proposed in the art to carry out the reaction in the presence of catalysts of the type exemplified by copper-zinc. While the prior art processes give quite large yields, they are susceptible to certain difficulties. For example, even the better catalysts in present use tend to become fairly rapidly deactivated with the consequent falling off of conversions, yields, and speed of reaction.

There are also known processes of producing nitriles which involve reacting hydrocarbons and various aromatic compounds with a large excess of oxygen and ammonia. These processes wherein a large excess of oxygen is used are not to be confused with the process to be described herein inasmuch as different reaction mechanism is involved. These processes using large excess of oxygen invlove the conversion of the starting compound to acid or the like which in turn reacts with ammonia for forming a nitrile by a mechanism substantially different than the mechanism of the present reaction.

Additional prior processes employing starting materials other than aldehydes are dependent upon vapor phase catalytic dehydrogenation for conversion of the starting material into nitrile. These latter processes may be conducted with or without the addition of inert diluents. A modified dehydrogenation obtains improved results by introduction into the reaction zone of a large amount of molecular oxygen whereby to achieve an oxidation. According to Mowry, Chem. Rev., 42, 249 (April 1948) the dehydrogenation reactions have been successful with amines, Schiff bases and the like, but where resort has been had to oxidation, the reaction apparently has been conducted in the absence of active substances other than the single starting material and oxygen (and the catalyst), the oxygen preferably being employed in a large excess, e. g., an amount up to 99.9%. The mechanism of the present reaction, which is quite distinct from any of the foregoing, will be discussed in detail hereinafter.

We have found an improved catalyst and an improved process of operation whereby aldehydes may be reacted with ammonia to produce nitriles in relatively high yields and over considerably longer continuous periods of operation than processes heretofore in use.

This invention has for one object to provide an improved method for the preparation of nitriles from the reaction of aldehydes and ammonia. A still further object is to provide an improved process for manufacturing saturated aliphatic nitriles from saturated aliphatic aldehydes whereby substantially higher yields may be secured and reasonably sustained operation accomplished. A particular object is to provide an improved method and catalyst especially adapted to the production of propionitrile and isobutyronitrile from the corresponding aldehydes, propionaldehyde and isobutyraldehyde, by reaction with ammonia. Another object of this invention is to provide an improved catalyst comprised of silver and zinc which is especially useful in reactions of the class described. Still another object is to provide an improved process of the class described wherein a relatively low controlled amount of oxygen i. e. 1–50 mole percent (preferably about 1–18 mole percent) of aldehyde feed may be incorporated in the process for improving the process and increasing catalyst life. A still further object is to improve the usual aldehyde-ammonia process for the production of nitriles by means of the combined effect of a novel catalyst and a relatively low controlled amount of molecular oxygen. Other objects will appear hereinafter.

The synthesis of nitriles from aldehydes and ammonia is an endothermic reaction and therefore considerable heat is utilized to maintain the feed vapors at a reaction temperature as they pass over the catalyst. The reaction may be carried out within the temperature range of about 250° C. to about 600° C., most advantageously with lower saturated aliphatic aldehydes at about 375° C. to 550° C. While, as discussed above, certain processes have already been proposed in the prior art for reacting aldehydes with ammonia, the conditions of operation are such that the usual catalysts lose activity rapidly with a resultant loss in conversions and yields.

In accord with the invention, the reaction may be improved by incorporating a controlled (relatively low) amount of oxygen in the reaction.

In further accordance with the invention, the reaction may be improved by employing a silver-zinc catalyst, the composition and method of preparation of which will be described hereinafter. Our invention contemplates further improvement by means of the combination of the two novel features. Air may be used as the source of oxygen or elemental oxygen as such may be employed. It is to be noted, however, it is important that no more than and preferably considerably less than the theoretical oxygen (less than one atom of oxygen per molecule of aldehyde) be used. In other words, only the employment of a controlled amount of oxygen is beneficial to the process. Too large an amount of oxygen, rather than improve the process, would cause serious loss of yields. That is, if excess oxygen were supplied, no (or little) aliphatic nitrile may be produced but more or less complete combustion may take place.

In the reaction it is probable that an aldehyde imine is formed and dehydrogenated to nitrile. The reaction may be formulated empirically as follows:

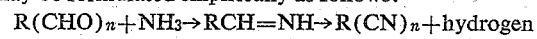

$R(CHO)_n + NH_3 \rightarrow RCH=NH \rightarrow R(CN)_n + \text{hydrogen}$

In the above formulation, $n$ is an integer from 1 to 2 and R represents a hydrocarbon radical of 1 to 8 carbon atoms. The invention is most advantageous with aliphatic, particularly saturated aliphatic aldehydes. When controlled amounts of oxygen less than theoretical, are employed in accordance with the invention, one function of the oxygen (air, or other source of oxygen) is to increase the length of the catalyst life. Thus, to some slight extent even with the preferred silver-zinc catalyst and even much more so with the prior art types of catalysts, catalyst activity may drop after 3 to 4 hours of operation. After 8–10 hours of operation with prior art catalysts, activity may substantially cease.

In direct contrast thereto, when 20% oxygen (i. e. molar percent based on the aldehyde) is used in accordance with the present invention, the oxygen being fed along with the aldehyde and ammonia, catalyst activity is still high even after 40 hours of operation.

In accordance with the invention, the amount of oxygen employed may be within the range of about 1–50 mole percent based on the aldehyde feed, but the most advantageous amount of oxygen normally will be in the range of 1–20 mole percent. The optimum range may be said to fall within 5–15 mole percent, but this varies somewhat with the particular aldehyde employed.

The oxygen may be premixed with the other ingredients and the mixture fed to the reaction. On the other hand, the various ingredients may be more or less separately preheated and separately but simultaneously fed to the catalyst. The catalyst may be maintained at its reaction temperature in any convenient manner. Hence, extended description of the manner of maintaining the catalyst temperature is not necessary. It is sufficient to state that the silver-zinc catalyst of the present invention is placed in a commercial catalyst unit, in the tubes or other usual means of supporting the catalyst, the catalyst being heated by the injection of heating means around the catalyst tubes or the like. As just indicated, a portion of the heat may be incorporated by supplying preheated oxygen, ammonia and aldehyde to the catalyst.

The novel silver-zinc catalyst of the invention is an intimate mixture being constituted essentially of the metals silver and zinc, preferably prepared by the reduction of a mixture of compounds of the two. The proportions of the two metals in the catalyst may be varied somewhat but best results are obtained where the two are present in about equal quantity, i. e. a range of 60–40 or 40–60 by weight. The foregoing and other details of operation will be apparent from the several examples which follow:

*Example 1*

The novel silver-zinc catalyst, containing 53–54% silver and 46–47% zinc, was prepared by reducing the ignited coprecipitated oxalates at 350° C. with 5% aqueous methanol until reduction was essentially complete. A mixture of isobutyraldehyde and ammonia, in a one to four molar ratio, was passed over the reduced silver-zinc catalyst at 400° C. and at a space velocity of 1200. The liquid products were condensed and residual gas was scrubbed with water to recover the unreacted ammonia. The scrubber water was extracted with xylene. The solvent and organic layers of the liquid products were combined, washed free of ammonia with water, and then fractionated as water azeotropes. The isobutyronitrile azeotrope, B. P. 83° C., represented a 94% conversion and a 95–96% yield. The pure dry nitrile was readily obtained by decanting the nitrile layer from the azeotrope, drying, and redistilling. The off-gas from the reaction analyzed 98% $H_2$ and was also equivalent to a 94% conversion. This catalyst had lost very little activity after 24 hours' use.

For comparison with the above high conversion that was obtained with the preferred catalyst, the following was carried out: there was passed one to four molar ratio of isobutyraldehyde and ammonia under substantially the same conditions as above but over a copper-zinc catalyst containing 33% copper. The initial yield was 84%. However, this copper-zinc catalyst lost considerable activity after eight to ten hours' use.

The preferred silver-zinc catalyst was regenerated by passing a mixture of 5 to 10 moles of steam to one of air over it for several hours at 300–350° C., followed by reduction with 5% aqueous methanol. This reactivated silver-zinc catalyst regained approximately its initial activity. On the other hand, the copper-zinc catalyst produced only 50–65% conversions after similar reactivation.

*Example 2*

Propionaldehyde was used in place of isobutyraldehyde under conditions similar to that described in Example No. 1. The space velocity used was 1500 with the catalyst at 425° C. Upon fractionation, propionitrile corresponding to an 88% conversion was isolated.

*Example 3*

Isovaleraldehyde and ammonia in 1:4 ratio was passed over a silver-zinc catalyst at 400° C. and a space velocity of 1100. Upon fractionation isovaleronitrile corresponding to a 90% conversion was isolated.

*Example 4*

Isobutyraldehyde and ammonia in 1:4 ratio was preheated to reaction temperature and mixed with one-half mole of air per mole of isobutyraldehyde just prior to passing over a silver-zinc catalyst at 425° C. Upon fractionation isobutyronitrile corresponding to an 88% conversion was obtained.

*Example 5*

The basic by-products (obtained from the distillation residue after azeotropically distilling off the isobutyronitrile produced in Example No. 4 above) were recycled along with fresh isobutyraldehyde, ammonia and air as used in Example No. 4. The yield of isobutyronitrile was above 95% based upon the isobutyraldehyde fed. Approximately the same amount of basic by-products were recovered for recycling in subsequent runs.

*Example 6*

Isobutyraldehyde (2.0 moles) was vaporized, mixed with 8.0 moles ammonia and 0.7 mole of air (14% of theory), and passed over a copper-zinc catalyst containing roughly ⅓ copper and ⅔ zinc, which had been previously used 32 hours without regeneration, at a space velocity of 3000 calculated at the reaction temperature of 475° C. Analysis of products shows an 82.5 percent yield of isobutyronitrile was obtained. The space time yield was nearly double that obtained without the use of air using a fresh copper-zinc catalyst at optimum conditions.

*Example 7*

Propionaldehyde (3.44 moles) was vaporized, mixed with 13 moles of ammonia and 1.50 moles of air (18% of theory), and passed over a copper zinc catalyst at 2300 space velocity at 480° C. to produce propionitrile in 72% yield.

*Example 8*

The data on representative runs with oxygen and several of the prior art catalyst types are listed in the following table. In the table the conversion to isobutyronitrile (IBN) is the conversion of aldehyde feed to nitrile. The yield is calculated as the actual yield per pass and is lower than the ultimate yield in that it has not taken into account the nitrile which is obtainable by recycling the high boiling products. The products of the runs reported were also characterized by the complete absence of pyridene derivatives and other nonrecoverable nitrogenous compounds the formation of which is characteristic of the prior art methods of preparing nitriles from aldehydes and ammonia. A high boiler present in the reaction was comprised almost entirely of alkylidene alkylvinyl amines which were recycled with additional ammonia and converted to the nitrile, or hydrolyzed with aqueous sulfuric acid to regenerate the starting aldehyde. Isobutyraldehyde was the aldehyde employed in each of the runs.

| Run No. | Catalyst Composition | Temp., °C. | Mole Ratio, $NH_3$/ald. | Mole Ratio, $O_2$/ald. | Contact Time, Secs. | Percent Conv. to IBN | Percent Conv. MAN |
|---|---|---|---|---|---|---|---|
| 1 | Ag wire | 500 | 1.1 | 0.20 | 0.43 | 69.2 | 5.24 |
| 2 | Ag wire | 505 | 1.1 | 0.0 | 0.67 | 84.1 | 0.51 |
| 3 | 12% $Cr_2O_3$ on $Al_2O_3$ | 500 | 4.18 | 0.0 | 0.59 | 61.0 | 0.92 |
| 4 | 12% $Cr_2O_3$ on $Al_2O_3$ | 500 | 4.03 | 0.09 | 0.78 | 92.0 | 6.31 |
| 5 | 12% $Cr_2O_3$ on $ZrO_2$ | 500 | 2.03 | 0.0 | 1.175 | 89.2 | 0.94 |
| 6 | 12% $Cr_2O_3$ on $ZrO_2$ | 502 | 2.12 | 0.15 | 1.22 | 91.4 | 6.12 |

The percent total yield of nitriles in the runs was as follows: (1) 87%; (2) 72%; (3) 61%; (4) 98.5%; (5) 90.4%; (6) 97.6%.

*Example 9*

Methacrolein (4.0 moles) was vaporized and preheated to a temperature of 300° C. The preheated aldehyde vapor was mixed with ammonia (16.03 moles) and air (2 moles) immediately below a bed of silver screens, one inch I. D. and two inches high. The silver screens were maintained at a temperature of from 440–500° C. by supplying additional heat as required. A contact time of 0.6–1.1 seconds was used and the conversion to methacrylonitrile was 65%. The ultimate yield was 88%.

With the use of copper pellets in place of the silver screens in the above example the conversion of methacrolein to methacrylonitrile was 71%. The ultimate yield was 88%.

In the above examples, while the silver-zinc type of catalyst is preferred, the operation of the process utilizing controlled amount of oxygen has also been shown as carried out with other type of catalysts. The employment of a relatively low controlled amount of oxygen as taught by us will be found useful to improve nitrile production through the reaction of aldehydes and ammonia in the presence of other catalysts such as the typical dehydrogenating metals silver, copper, cobalt or mixtures thereof. Further, the catalyst may be a suitably prepared metal oxide containing one or more of the metals copper, silver, cobalt, chromium, zinc, manganese, magnesium, thorium, aluminum, silicon, sodium or their oxides. Other suitable catalysts include oxides of chromium, vanadium, molybdenum, and the like deposited on a suitable non-reducible oxide such as thorium oxide, aluminum oxide, zirconium oxide, titanium oxide and/or mixtures thereof. The preferred silver-zinc catalyst may also contain minor proportions of other components such as copper, tin, cobalt, chromium, vanadium, magnesium, manganese and the alkaline metals. Hence, when we refer to a silver-zinc catalyst and contemplate the type of catalyst fully described in Example 1 hereof, it is also contemplated that certain small amounts of other components may be present which do not adversely affect the silver-zinc.

The space velocity of the feed materials to and through the reactor may be of the order of 200–5000. The nitrile product produced may readily be condensed by passing through condensers at the temperature of 20–60° C. The effluent vapors from the condensation pass through one or more scrubber units to recover ammonia. The unreacted ammonia may be separated and recirculated to the start of the process. The liquid nitrile product may be separated in a more purified form by distillation.

Pressure within the reactor may be varied widely. Atmospheric pressure is generally satisfactory. The mole ratio of ammonia to aldehyde initially introduced into the reaction vessel also may vary widely. The optimum varies with the particular aldehyde but generally falls within the range of 1:1 to 10:1.

The nitrile products produced by the improved reaction are useful as solvents, chemical intermediates and the like. The lower nitriles may be converted into the unsaturated nitriles useful in the preparation of plastics, textiles and the like. That is, the nitriles such as propionitrile and isobutyronitrile may be dehydrogenated or otherwise converted into acrylonitrile or methacrylonitrile for preparing various polymeric materials, although of course the method of the invention also contemplates the direct conversion into these lower unsaturated nitriles of the corresponding unsaturated aldehydes.

We claim:

1. In a continuous process for the preparation of a lower aliphatic nitrile including the steps of reacting a vapor phase mixture of ammonia and an aliphatic aldehyde of 1 to 9 carbon atoms by passing the mixture at a space velocity between 100 and 5000 through a bed of a solid catalyst maintained at a temperature within the range of 250° to 550° C. and recovering the nitrile from the reaction effluent, an improved method comprising the steps of contacting the reaction mixture in the catalyst bed with a catalyst mass consisting essentially of a reduced mixture of silver and zinc metals of approximately equal proportions by weight, simultaneously providing the vapor mixture with a controlled, relatively small supply of molecular oxygen, and maintaining the oxygen supply to the mixture at a rate which will provide the mixture with 1 to 50 mole percent of oxygen based on the aldehyde.

2. In a continuous process for the preparation of isobutyronitrile including the steps of reacting a vapor phase mixture of ammonia and isobutyraldehyde by passing the mixture at a space velocity of between 200 and 5,000 through a bed of a solid catalyst maintained at a temperature within the range of 375° to 550° C. and recovering isobutyronitrile from the reaction effluent, an improved method comprising the steps of contacting the reaction mixture in the catalyst bed with a catalyst mass consisting of silver and zinc, simultaneously providing the reaction mixture with a controlled, relatively small supply of molecular oxygen, and maintaining the oxygen supply to the mixture at a rate which will provide the mixture with 1 to 50 mole percent of oxygen based on the aldehyde.

3. In a continuous process for the preparation of propionitrile including the steps of reacting a vapor phase mixture of ammonia and propionaldehyde by passing the mixture at a space velocity of between 200 and 5,000 through a bed of a solid catalyst maintained at a temperature within the range of 375° to 550° C. and recovering propionitrile from the reaction effluent, an improved method comprising the steps of contacting the reaction mixture in the catalyst bed with a catalyst mass consisting of silver and zinc, simultaneously providing the reaction mixture with a controlled, relatively small supply of molecular oxygen, and maintaining the oxygen supply to the mixture at a rate which will provide the mixture with 1 to 50 mole percent of oxygen based on the aldehyde.

4. In a continuous process for the manufacture of a lower saturated aliphatic nitrile by catalytic vapor phase reaction of an aldehyde with ammonia, an improved method comprising the steps of continuously contacting the lower saturated aliphatic aldehyde with ammonia and simultaneously with a relatively low controlled amount of oxygen in the presence of a catalyst consisting of silver and zinc maintained at a temperature within the range of 250° to 550° C., and continuously regulating the oxygen supply to maintain an oxygen concentration in the reaction of less than one atom of oxygen per molecule of aldehyde.

5. A process as defined in claim 4 wherein the lower aliphatic aldehyde contains from 2 to 9, inclusive, carbon atoms and the temperature is maintained in the range of 375°–500° C.

6. A process as defined in claim 4 wherein the reacting aldehyde and ammonia are maintained in ratio of about 1 to 4.

7. A process as defined in claim 4 wherein unreacted ammonia is recovered from the reaction products, mixed with fresh aldehyde and recycled to the reaction.

8. A process as defined in claim 4 wherein an oxygen concentration equivalent to not more than one atom of oxygen per four molecules of aldehyde is maintained.

9. A process as defined in claim 4 wherein the lower saturated aliphatic aldehyde is isobutyraldehyde and the temperature is maintained within the range of 375° C. to 500° C.

10. A process as defined in claim 4 wherein the lower saturated aliphatic aldehyde is propionaldehyde and the temperature is maintained within the range of 375° C. to 500° C.

11. A process as defined in claim 4 wherein the lower saturated aliphatic aldehyde is valeraldehyde and the temperature is maintained within the range of 375° C. to 500° C.

12. A process as defined in claim 4 wherein unreacted ammonia and basic by-products are separated from the reaction products, mixed with fresh aldehyde and recycled to the reaction.

References Cited in the file of this patent

UNITED STATES PATENTS

| | | |
|---|---|---|
| 2,443,420 | Gresham | June 15, 1948 |
| 2,525,818 | Mahan | Oct. 17, 1950 |
| 2,653,964 | Hagemeyer | Sept. 29, 1953 |
| 2,691,037 | Bellringer et al. | Oct. 5, 1954 |

OTHER REFERENCES

Mowry: Chem. Reviews, vol. 42, p. 249 (1948).